Patented May 10, 1932

1,858,186

UNITED STATES PATENT OFFICE

JESSE J. CANFIELD, OF TALLANT, OKLAHOMA, ASSIGNOR, BY MESNE ASSIGNMENTS, TO EMPIRE OIL AND REFINING COMPANY, OF DOVER, DELAWARE, A CORPORATION OF DELAWARE

METHOD OF AND REAGENT FOR TREATING WET OILS

No Drawing.  Application filed January 27, 1928.  Serial No. 250,081.

This invention relates to the treatment of wet oils, and more particularly to a method of and chemical reagent for treating petroleum oil associated with natural waters to inhibit the formation of resistant BS emulsions of the water-in-oil type and to resolve any such emulsions previously formed.

Various methods and chemical reagents have been proposed and utilized for treating the comparatively stable and resistant BS emulsions which, because of their relatively large volume and the difficulties they offer to distillation or other treatment, constitute such a serious problem to the oil industry. It has also been proposed to treat petroleum oils associated with natural waters prior to their removal from the producing wells in such a way as to prevent the formation of such BS emulsions.

One object of the present invention is to provide an improved method of and chemical reagent for treating oil-water mixtures to inhibit the formation of emulsions of the water-in-oil type and to resolve such emulsions into their oil and water constituents in cases where they have already formed.

Another object of the present invention is to provide a liquid chemical treating agent possessing highly advantageous physical and chemical properties which make it more effective in inhibiting the formation of and in resolving water-in-oil emulsions than reagents now obtainable for such purposes.

A more specific object of the invention is to provide a liquid chemical reagent of the above character having satisfactory low cold test properties permitting its use in a concentrated form at temperatures at and below the freezing point of water.

With these and other objects and features in view, the invention consists in the improved method of and reagent for treating wet oil hereinafter described and more particularly defined in the claims.

Essentially the reagent forming the subject of the present invention consists of a homogeneous low freezing point liquid solution or mixture of two principal components. The basic component of this reagent may be broadly characterized as a hydrocarbon substituted derivative of a polycyclic sulfo-aromatic compound. The other principal component of the reagent consists of a low freezing point liquid halogen derivative of an aromatic hydrocarbon, usually associated in the reagent with water, or with cresylic acid, or with both water and cresylic acid. A specific example of a reagent of the type forming the subject of the present invention is the homogeneous low freezing point liquid mixture formed by adding from 10% to 20% of the weight of the reagent, each, of cresylic acid, chlor-benzene and water to the solid salt or soap like material formed on neutralizing with aqueous ammonia solution the crude oily top layer reaction product of the "coupling" sulfuric acid treatment of a mixture of naphthalene sulfonic acids and isopropyl alcohol, under the controlled conditions hereinafter described.

This specific reagent may be prepared as follows: Commercial naphthalene is sulfonated with an excess of concentrated (66° Bé.) sulfuric acid added slowly and with vigorous stirring under conditions yielding a mixture of alpha and beta naphthalene mono-sulfonic acids, with the beta acid largely predominating (about 85% beta and 15% alpha). The temperature of this sulfonation is maintained within a range of from 170° C. to 176° C. throughout a four-hour period, with constant agitation of the reaction mixture. The reaction product of this sulfonation treatment is used without purification in preparing the basic component of the de-emulsifying reagents of the present invention. In addition to the alpha and beta naphthalene monosulfonic acids this reaction mass contains small amounts of unchanged naphthalene, free sulfuric acid and other sulfonation products. To every twenty parts by weight of the above sulfonation mass there is added fifteen parts of isopropyl alcohol and fifteen parts of concentrated sulfuric acid (specific gravity 1.84), this second sulfuric acid treatment being carried on at a temperature of approximately 88°–90° C. with continuous agitation. The preferred method of carrying on this second sulfuric acid "coupling" treatment for the purpose of effecting the substitution of one or more isopropyl groups for one or more hydrogen atoms in the naphthalene nucleus, is as follows: Five parts of the isopropyl alcohol are first added very slowly to the sulfonation mass resulting from the above primary sulfonation treatment of naphthalene. After allowing a short interval for thorough mixing, five parts of concentrated sulfuric acid are slowly added to the mixture thus formed. After the dehydration and coupling reaction thus set up has proceeded for about half an hour, an additional five parts each of the alcohol and of the sulfuric acid are added in the same manner followed in the first addition step of this treatment. After the reaction has proceeded for another half-hour period a third addition of isopropyl alcohol and sulfuric acid is made in the same manner as before. After this final addition of alcohol and sulfuric acid the reaction mass is maintained at the desired temperature of 88° C. to 90° C. for an additional two hours with constant agitation, so that the total time required to complete this second dehydration and "coupling" treatment comprises three hours. The time of sulfonation and "coupling" may be considerably modified by the physical equipment used, the speed of agitation, and numerous other factors. Depending upon the capacity of the apparatus from three to eight hours may be required to complete the "coupling" reaction. Any increase in efficiency of agitation or in speed of starting will tend to cut down the time required for proper "coupling." In general the "coupling" reaction may be recognized as complete when a test sample removed from the violently agitated mass, rapidly and sharply separates into an upper "oily layer" and lower "acid layer." The reaction product of this "coupling" reaction is passed while still hot into a separatory vessel and is maintained in a quiescent state therein until a complete separation into two layers takes place. The lower layer consists of unchanged naphthalene sulfonic acid, sulfuric acid, isopropyl alcohol, water, and other reaction products of the alcohol and sulfuric acid, including propylene polymers. The upper oil layer is the desired "coupling" product which will be hereinafter referred to as a propylated naphthalene sulfonic acid.

To make up the specific reagent described in the aforementioned example there is added to this upper oil layer, that is to the propylated naphthalene sulfonic acid, about 15% of its weight of water, about 15% of its weight of commercial cresylic acid and about 15% of its weight of chlor-benzene, after which sufficient aqueous ammonia solution is added to effect a complete neutralization of the "coupled" product. 15% or 20% additional water may be added to the mixture if desired. The exact composition of the emulsion-inhibiting and emulsion-splitting reagent, as prepared above, is not definitely known, but it is believed to be a homogeneous solution, colloidal suspension, or mixture of water, cresylic acid, chlorbenzene and ammonium salts of mono-, di-, tri-, tetra-, and perhaps even higher isopropyl derivatives of alpha and beta naphthalene mono- and di-sulfonic acids, with the ammonium salt of di-isopropyl beta-naphthalene mono-sulfonic acid predominating.

In the practical application of the liquid reagent of the present invention to the treatment of wet oil in accordance with the method of the invention, it is preferred to inject the concentrated reagent, or alternatively a water solution or suspension or a colloidal solution or suspension in oil thereof, into the casing head of the particular well giving trouble from formation of BS emulsions continuously or intermittently during the period in which oil is being removed from the well. However, in cases where it is found more practical to treat the wet oil after it has been taken from the well and after the BS emulsions have already been formed by reason of agitation set up in raising the oil to the top of the well, it may be done by injecting a predetermined amount of the treating agent into the pipe lines leading from the well during the periods in which the well is in operation, or alternatively by adding suitable amounts of the treating agent to the wet oil after it has been separated from the non-emulsified portion of its water content in the settling tanks adjacent to the head of the well casing. Where the treatment is carried on above ground the chief function of the treating agent is that of resolving emulsions which have already formed, whereas in carrying on the treatment within the well itself the chief function of the treating agent is to condition the oil-water mixture so as to inhibit the formation of BS emulsions of the water-in-oil type. In some cases it may be found advantageous to carry out the de-emulsification treatment in a special treating tank fitted up with agitators and a steam heating coil. Thus by increasing the temperature of the oil under treatment its viscosity is considerably lowered with the result that the effectiveness of the treating agent in actively breaking down any water-in-oil emulsions is increased, and the rate at which the water or brine liberated from the emulsion settles to the bottom of the treating tank is also increased.

It has been found that a concentrated solution of the specific treating agent above described will break the most stubborn BS emulsions when used in amounts of less than 1% by volume of the wet oil being treated. In general less than ½% by volume of the concentrated treating agent is effective in inhibiting the formation of BS emulsions.

The specific treating agent above described, (and also the modifications thereof hereinafter referred to) is soluble in water, including salt water, in the amounts used for effectively treating wet oil in accordance with the method of the invention. Moreover, the alkaline earth salts of the reagent are sufficiently water soluble so that the amounts of such salts formed during the treatment with the amount of treating agent necessarily employed, including the calcium and magnesium salts, are not precipitated and accordingly have no stabilizing effect on the emulsion component of the wet oil under treatment.

It has been observed that the treating agent of the present invention produces a rapid initial lowering effect on the surface tension of any water with which it is brought in contact. It is believed, therefore, that the action of the treating agent in inhibiting the formation of BS emulsions and in resolving such emulsions is chiefly of a physical or physicochemical nature, that is, largely the results of surface tension effects. However, it is to be understood that the invention is not based or dependent upon or limited to any theory except such as is specifically set forth in the accompanying claims.

It has been found that the actual chemical composition of the specific reagent previously mentioned may be modified in several particulars without materially sacrificing the effectiveness or advantageous physical and chemical properties of the treating agent of the present invention in the treatment of wet oil. Thus a satisfactory reagent of the type forming the subject of the present invention may include as its basic component a compound having an anthracene, naphthol, chlor-naphthalene or other polycyclic aromatic nucleus to which there has been added, by substitution, one or more sulfonic acid groups and one or more alkyl, aryl or aralkyl radicals derived for example from normal or secondary butyl alcohol or from other primary or secondary fatty alcohol, such substitution being effected by a "coupling" sulfuric acid treatment of a mixture of such alcohol and the sulfonic acid derivative of said polycyclic aromatic body similar to that previously described. As alternative to the ammonium salts used as the basic component of the specified reagent, the salts formed by neutralizing the acidic sulfo acid product of the "coupling" treatment with caustic potash or other alkaline neutralizing reagent may be employed.

Similarly, as alternative to the chlor-benzene component of the aforementioned specific reagent, chlor-naphthalene or other relatively low freezing point liquid halogen derivatives of an aromatic hydrocarbon may be satisfactorily employed.

Likewise carbolic acid or other low freezing point phenol may be substituted for the cresylic acid of the specific reagent mentioned above.

Satisfactory modifications of the treating agent of the present invention can be prepared as follows:

1. To about twenty-five pounds of the crude isopropyl naphthalene sulfonic acid mixture obtained as a top layer oily product of the "coupling" sulfuric acid treatment previously described, there is added about five pounds of cresylic acid and about eight pounds of chlor-benzene; eight and one half pounds of 26° Bé. ammonia is then added, together with about one and one half pounds of water, to effect neutralization of the mixture. The liquid mixture thus formed is a clear easy-flowing liquid at ordinary temperatures and on being cooled to the freezing point of water retains the properties of an easy-flowing homogeneous liquid mixture, although in some cases it has been observed that some small separation of crystals takes place if this mixture is allowed to stand for a long time at a temperature of 32° F.

2. A reagent prepared in exactly the same way as under 1 above, except that chlor-naphthalene is employed in place of chlor-benzene. The reagent thus prepared has properties very similar to those of the reagent prepared under Formula 1.

3. To twenty-five pounds of the top layer or oil layer product of the "coupling" treatment there is added four pounds of water, four pounds of cresylic acid and four pounds of chlor-naphthalene. The mixture thus formed is neutralized with aqueous ammonia and sufficient water is added to make up the weight of the reagent to forty-eight pounds. The reagent thus formed is free-flowing and will not solidify or separate crystals at temperatures well below the freezing point of water.

The crude "coupled" sulfonic acid or isopropyl napthalene sulfonic acid product of the "coupling" sulfonation treatment described is a heavy viscous red brown oil. Upon neutralization of this "coupled" sulfonic acid product with ammonia water, ammonium, sulfate, water and other substances, including propylene polymers, remain in the top oil layer which separates on completion of the "coupling" treatment. It has been found that some of these apparent impurities, particularly the propylene polymers (diisopropylene and the like), are apparently advantageous rather than deleterious constituents of the basic component of the present reagent. The basic component of the specified reagent, containing such propylene polymers, water, ammonium sulfate and other impurities in addition to more than 80% of the ammonium salt of the "coupled" sulfonic acid product of the "coupling" treatment, is a solid at ordinary temperatures.

The treating agent forming the subject of the present invention is in every case a homogeneous liquid mixture which will not stratify or separate crystals at temperatures much, if any, above the freezing point of water.

Considering the individual components of the treating agents of the present invention from the standpoint of the properties which their presence imparts to the reagent, it is believed that the hydrocarbon substituted polycyclic sulfo aromatic component (that is the ammonium salt of the isopropyl naphthalene sulfo acid, or its equivalent) is the principal active component of the treating agent in inhibiting the formation of water-in-oil emulsions and in resolving such emulsions. The chlor-benzene or other liquid halogenated aromatic hydrocarbon and also the cresylic acid sometimes present in the treating agent, both apparently add to the effectiveness of the treating agent in performing its principal function, probably because these additional components cause the solid basic component of the reagent to assume and retain the physical properties of a true liquid, without any tendency to stratification or crystallization even at temperatures below the freezing point of water. In other words the cresylic acid component of the present treating agent acts alone, or in conjunction with the chlor-benzene or its equivalent, to change the physical character of the basic ammonium isopropyl naphthalene sulfonate, or its equivalent, from a colloidal or crystalline solid condition at ordinary temperatures to that of a true solution or liquid non-stratifiable mixture. The apparent solvent and freezing point depressing functions of the cresylic acid and halogenated aromatic components of the present treating agent are important in that they insure the liquid stability of the reagent, in which (liquid) state it is more conveniently stored and transported and effectively applied in a concentrated form to oil-water mixtures.

The cresylic acid component of the present treating agent apparently has a decided solvent action for the more readily water soluble portion of the lower mono- and dipropylated naphthalene sulfo acid salts present in the treating agent of the first specified example. Furthermore, the cresylic acid apparently acts during the treatment of oil-water mixtures to remove adsorbed oil from the finely divided solid matter or dirt which is often carried in suspension in the BS emulsion under treatment, thus permitting this dirt to settle out of the emulsion in the treating tank. This is an advantageous property of the present treating agent in that when the oil adsorbed on the dirt of the BS emulsion is not separated therefrom the buoyancy of the adsorbed oil tends to raise the dirt to the top of the layer of water which separates from the treated oil at the end of the treatment, and thereby increases the difficulty of separating the water from the supernatent layer of oil. The chlor-benzene component of the present treating agent, or its equivalent, apparently has a marked solvent action for the tri-, tetra- and higher propylated derivatives of the naphthalene sulfo acids, such higher propylated derivatives being much less water soluble than the lower propylated derivatives resulting from the "coupling" treatment. For this reason a reagent containing both cresylic acid and chlor-benzene or other liquid halogen derivative of an aromatic hydrocarbon is generally characterized by being a homogeneous liquid solution or mixture even at temperatures below the freezing point of water.

Although the method of treating oils and the reagents to be used have been referred to as particularly adapted for resolving and preventing the formation of petroleum oil-water emulsions, it is to be understood that the method and reagents are not limited to such use, but may be effectively employed in the treatment of mixtures of water and other types of mineral, animal, and vegetable oils while in an emulsified or unemulsified state.

The term "hydrocarbon substituted derivative of a polycyclic sulfo aromatic compound" has been used in the description and claims as a generic term to define a compound having a polycyclic aromatic nucleus in which one or more alkyl, aryl or aralkyl radicals and one or more sulfonic acid or sulfonate groups have been substituted in the place of a corresponding number of hydrogen atoms originally attached to said nucleus.

The invention having been thus described, what is claimed as new is:

1. The method of treating an oil-water mixture to inhibit the formation of water-in-oil emulsions and to resolve any such emulsions previously formed, comprising subjecting the oil-water mixture to the action of a liquid chemical treating agent comprising a hydrocarbon substituted derivative of a polycyclic sulfo aromatic compound and a low freezing point liquid halogen derivative of an aromatic hydrocarbon.

2. The method of treating an oil-water mixture to inhibit the formation of water-in-oil emulsions and to resolve any such emulsions previously formed, comprising subjecting the oil-water mixture to the action of a liquid comprising a hydrocarbon substituted derivative of a polycyclic sulfo aromatic compound, a liquid halogen derivative of an aromatic hydrocarbon, and cresylic acid.

3. The method of treating an oil-water mixture to inhibit the formation of water-in-oil emulsions and to resolve any such emulsions previously formed, comprising subjecting the oil-water mixture to the action of a liquid comprising a hydrocarbon substituted derivative of a polycyclic sulfo aromatic compound, a low freezing point liquid halogen derivative of an aromatic hydrocarbon, water, and cresylic acid.

4. The method of treating an oil-water mixture to inhibit the formation of water-in-oil emulsions and to resolve any such emulsions previously formed, comprising subjecting the oil-water mixture to the action of a liquid comprising a hydrocarbon substituted derivative of a polycyclic sulfo aromatic compound, a low freezing point liquid halogen derivative of an aromatic hydrocarbon, and propylene polymers.

5. The method of treating an oil-water mixture to inhibit the formation of water-in-oil emulsions and to resolve any such emulsions previously formed, comprising subjecting the oil-water mixture to the action of a liquid mixture of an isopropyl naphthalene sulfo compound, water, cresylic acid and a low freezing point liquid halogen derivative of an aromatic hydrocarbon.

6. The method of treating an oil-water mixture to inhibit the formation of water-in-oil emulsions and to resolve any such emulsions previously formed, comprising subjecting the oil-water mixture to the action of a liquid mixture of a hydrocarbon substituted derivative of a polycyclic sulfo aromatic compound, water, cresylic acid and chlor-benzene.

In testimony whereof I affix my signature.

JESSE J. CANFIELD.